United States Patent [19]
Sierzega

[11] 3,904,523
[45] Sept. 9, 1975

[54] APPARATUS AND METHOD FOR SUBSTANTIALLY REMOVING DEBRIS FROM A SLURRY

[76] Inventor: Ronald J. Sierzega, 3405 Lehigh St., Whitehall, Pa. 18052

[22] Filed: Feb. 25, 1971

[21] Appl. No.: 118,856

[52] U.S. Cl. .................. 210/79; 210/447; 210/454
[51] Int. Cl.² ......................................... B01D 35/02
[58] Field of Search ............ 210/79, 310, 416, 454, 210/447

[56] References Cited
UNITED STATES PATENTS

| | | | |
|---|---|---|---|
| 1,794,916 | 3/1931 | Naugle | 210/416 X |
| 2,552,744 | 5/1951 | Smith | 210/447 |
| 3,174,171 | 3/1965 | McDermon | 210/310 X |
| 3,552,552 | 1/1971 | Johnston | 210/447 |

*Primary Examiner*—John Adee

[57] ABSTRACT

A method and apparatus for substantially removing debris from the slurry, being fed through a suction pump, includes the steps of transmitting the slurry from the valve to the suction pump along a passageway. A T shaped hollow pipe fitting having a serial section is interposed with an inlet end coupled to the valve and an outlet end coupled to the pump. The pipe fitting further includes a shunt section having a first end engaging the serial section intermediate the inlet end and the outlet end, and a second end adapted to receive the closure cap. The second end is engaged with a closure cap having coupled thereto a plurality of rods which have a length sufficient to extend completely through the shunt section and into the serial section so as to trap debris which passes from the inlet end to the outlet end, the rods being independent from each other and free of connection to each other except for the coupling to the closure cap. Then, the valve is opened so that the slurry passes through the valve to the pump whereby debris is substantially trapped by the rods. On occasion, the valve is closed, the closure cap is disengaged from the second end and the rods are wiped in a motion from their closure cap ends to their free ends to remove debris which is entrapped thereon, and, then, the closure cap is reengaged with the second end and the valve is opened.

13 Claims, 9 Drawing Figures

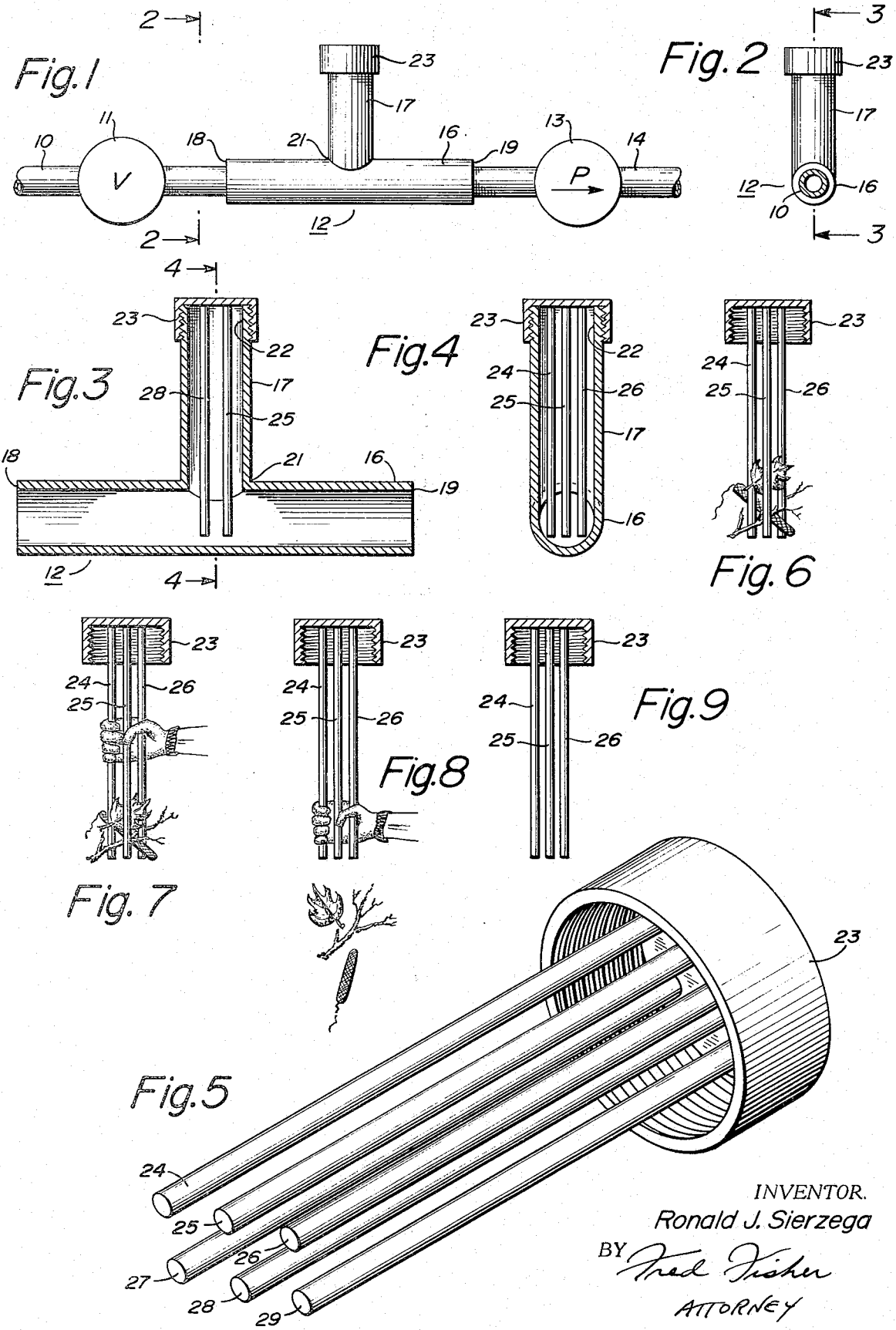

APPARATUS AND METHOD FOR SUBSTANTIALLY REMOVING DEBRIS FROM A SLURRY

BACKGROUND OF THE INVENTION

1. Field of the Invention

This invention relates to methods of and apparatus for removing debris from a slurry and, in particular, relates to a rod type trap and methods for its use. Accordingly, the general objects of the invention are to provide new and improved methods and apparatus for substantially removing debris from a slurry.

Waste matter from industrial sources, such as meat packing plants for example, are treated at the present time by biological or chemical means so that the waste matter can be converted to non-obnoxious solids and to effluent water. In such chemical treatment of sludge of industrial waste or sewage, and treatment of such sludge and slurry, it is desirable to transmit the slurry from one point to another for proper treatment. The transmittal of the slurry from one point to another is best achieved through the aid of a pump, sometimes known as a sludge pump. In the past, however, problems occured due to the sludge pump being blocked by weeds, sticks, plastics, catamenial towels, and other sorts of debris.

2. Description of the Prior Art

The following United States Patents, found during the course of a novelty search performed on behalf of the inventor, are cited as of being of interest in that they delineate the prior art known to the applicant. They are:

Ralston, U.S. Pat. No. 737,138, issued Aug. 25, 1903. (Ralston discloses rods used to cover an opening in an eaves trough.)

Morrison, U.S. Pat. No. 927,743, issued July 13, 1909. (Morrison discloses filters with strainers supported by parallel spaced bars.)

Kerr, U.S. Pat. No. 2,630,920, issued Mar. 10, 1953. (Kerr discloses a screw cap in a pipe with a strainer which is a perforated pipe strainer.)

Dileo, U.S. Pat. No. 2,651,382. (Dileo discloses a trap with a screw head and has a rod attached to the cap with radial arms extending therefrom.)

Known prior art includes a trap having a + configuration in which material is passed from one side of the trap to the other. An element attached to a closure cap on the top of the trap extends downwardly through the trap for the primary purpose of trapping magnetic particles. The trap incorporates, at its bottom, a sump to help trap via gravity non-magnetic particles that tend to settle to the bottom of the enclosure. Such a trap is designed to reduce damage and maintainence to pumps to prevent them from jamming. These traps, however, are designed primarily to free a product of ferrous metal contamination and to prevent abrasive wear. Such traps include powerful magnetic members designed to catch and hold iron contamination. They can be easily removed to inspect and clean.

One trap of the prior art is described in sales literature as follows:

"The magnetic element, consisting of a group of magnetic tubes, is so arranged to cause a material flow entering the body to impinge against the tubes and filter through the magnetic field, completely covering the open area. This arrangement takes advantage of the material change in direction and difference in inertia between the unwanted iron and the material carrying it. The magnetic circuit is designed so the entrapped iron will have a tendency to work around and cling to the downstream side of the tubes . . . This action prevents iron particles from being washed off by the continuous flow of material. Ferris Traps "pocket type" body contour tends to spread the material up and down and cause it to pass around and through the magnetic barrier in relatively thin streams without causing a flow restriction in the unit. With this design, installed with the closure either up or down, a sump is provided that tends to trap heavy nonmagnetic objects such as stones, etc."

A serious disadvantage of such a prior art type trap is that it requires a unit having a sump incorporated therein, especially that of a + configuration.

SUMMARY OF THE INVENTION

It is an object of this invention to provide novel apparatus and methods for substantially removing debris from a slurry.

It is a further object of this invention to provide a novel trap for removing debris from a slurry which is less expensive and easier to manufacture than prior art traps.

Yet another object of this invention is to provide a novel trap for removing undesired debris such as sticks, weeds, plastics, catamenial towels, and the like from sludge prior to its being recycled by mechanical pumps.

Still another object of this invention is to provide a novel trap for removing debris incorporating a T shaped pipe fitting.

In accordance with this invention, a trap for substantially removing debris from a slurry includes a T shaped hollow pipe fitting. The pipe fitting has a serial section with an inlet end and an outlet end. The pipe fitting further includes a shunt section which has a first end engaging the serial section intermediate the inlet end and an outlet end, and a second end adapted to receive a closure cap, which closure cap is adapted to engage with such second end. A plurality of extending rods is coupled to the closure cap, the rods having a length sufficient to extend completely through this shunt section and into the serial section so as to trap debris passing from the inlet end toward the outlet end.

In accordance with specific features of the invention, the rods are coupled to the cap in a staggered relationship. The rods can be oriented parallel to each other.

In accordance with still other features of the invention, one end of each of the rods is coupled to the closure cap and the other end of each of the rods is free.

In accordance with yet other features of the invention, the pipe fitting is oriented in an inverted T relation, whereby the shunt section is oriented in an upwardly vertical direction. The rods can be coupled to the cap in a staggered relationship with the rods oriented parallel to each other, one end of each of the rods being coupled to the closure cap and the other end of each of the rods being free. The free ends of the rods can come into close proximity with, but preferably do not touch, the inner wall of the serial section opposing the shunt section. The closure cap, ideally, is adapted to engage with the shunt section by threaded screw means.

In accordance with still other specific features of the invention, a valve is coupled to the inlet end of a pipe fitting and a suction pump is coupled to the outlet end of the pipe fitting.

In accordance with another embodiment of the invention, a method for substantially removing debris from a slurry being fed through a suction pump includes a number of steps, including transmitting the slurry from a valve to a suction pump along a passageway. A T shaped hollow pipe fitting is interposed, the pipe fitting having a serial section with an inlet end coupled to the valve and an outlet end coupled to the pump. The shunt section of the pipe fitting has a first end engaging the serial section intermediate the inlet end and the outlet end of the pipe fitting. The shunt section has a second end adapted to receive, and engage with, a closure cap. The closure cap has a plurality of rods coupled thereto having a length sufficient to extend completely through the shunt section and into the serial section so as to trap debris which passes from the inlet end to the outlet end. The rods are independent from each other and free of connection to each other except for their coupling to the closure cap. The valve is opened so that slurry passes through the valve to the pump whereby debris is substantially trapped by the rods. On occasion, the valve is closed; the closure cap is disengaged from the second end, and the rods are wiped in a motion from their closure cap ends to their free ends, to remove debris which is entrapped thereon. Then, the closure cap is reengaged with the second end and a valve is opened.

BRIEF DESCRIPTION OF THE DRAWINGS

Other objects, advantages, and features of the present invention will appear upon consideration of the following detailed description of a specific embodiment, in conjunction with the accompanying drawings, wherein:

FIG. 1 is a plan view of the novel trap in accordance with one embodiment of the invention, including a pump and a valve;

FIG. 2 is a cross-sectional view taken along the line 2—2 of FIG. 1;

FIG. 3 is a cross-sectional view taken along the line 3—3 of FIG. 2;

FIG. 4 is a cross-sectional view taken along the line 4—4 of FIG. 3;

FIG. 5 is a perspective view of the closure cap and extending rods used in conjunction with the invention; and FIGS. 6, 7, 8, and 9 are views illustrating a method illustrating how debris can be wiped away from the rods of the closure cap in accordance with one embodiment of the invention.

DESCRIPTION OF A PREFERRED EMBODIMENT

Referring to FIG. 1, a slurry such as sludge is passed from a suitable container (not shown) such as a lagoon, through a pipe 10, through a valve 11, through a trap 12, and, hence, to a pump 13, through a pipe 14 to a suitable sewage disposal container for subsequent treatment. The trap 12 is designed to remove undesired debris such as weeds, sticks, plastics, catamenial towels, and the like.

The trap 12 includes a T shaped pipe fitting having a serial portion 16 and a shunt portion 17. The serial portion 16 includes an inlet end 18 coupled to the valve 11. The serial portion 16 further includes an outlet end 19 coupled to the pump 13. The shunt section 17 of the pipe fitting 12 has one end 21 thereof which engages the serial section intermediate the inlet end 18 and the outlet end 19. The opposite end 22 of the shunt section 17 is adapted to receive a closure cap 23. Preferably, the end 22 and the cap 23 are threaded so as to fit or engage with one another. As depicted, the shunt section, at its end 22, is shown with a male thread thereon, while the closure cap 23 has a female thread for engaging with the male thread of the shunt section 17. It is, of course, within the skill of the art that the threading may be of opposite sex, namely, that the shunt section have a female thread while the closure cap have a male thread. Alternatively, other fittings are within the skill of the art, it being desired merely that the two members be easily connected or disconnected one from the other.

The closure cap 23 has a plurality of rods 24–29 depending therefrom. The rods can be oriented in a manner so that three rods 24, 25, 26 are parallel to each other and arranged in a row in a plane perpendicular to a flow of the sludge or slurry through the shunt portion 16 of the trap 12. Behind the three extending rods 24, 25, 26 can be another set of rods 27, 28, 29 oriented in such a manner that the rods are parallel to each other. The rods, however, if desired, can be in a staggered relationship. The rods are shown depicted in a perspective view in FIG. 5. Referring, however, to FIGS. 3 and 4, it is shown that the rods extend into the trap to a point where they come close to, but do not engage with, the opposite wall of the shunt section 16 of the T shaped pipe fitting 12.

By way of illustration and not by way of limitation, the pipe fitting may have a 4 inch diameter. The various rods can be one-quarter inch in diameter, spaced 1½ inches apart.

In operation, after the unit is assembled, the valve is opened, permitting sludge to pass through the pipe 10, through the valve 11, through the trap 12, and through the pump 13 along the pipe 14 to the subsequent container. The debris is trapped by the extending rods 24–29 within the T shaped pipe fitting 12 and, in time, the trap can be cleaned. Between cleaning intervals, sludge passes through the pump 13 substantiallyl free of debris.

To clean the trap, it is merely necessary to close the valve, remove the closure cap 23 from the shunt portion 17 of the pipe fitting, and then (as depicted in FIGS. 6 through 9) wipe the debris free from the extending rods of the closure cap in the direction from the closure cap toward the free ends. Thus, in one pass of the hand, the debris can be wiped clear of the extending rods. As depicted in the drawing, a gloved hand is shown. However, the hand can be bare; alternatively, the debris can be wiped clean with a rag. It is the intent that the removal of the debris by a rag, a glove, and by the bare hand is within the scope of this invention.

Following cleaning of the rods, the closure cap with the extending rods is reengaged with the shunt section of the T shaped pipe fitting 12 and then the valve 11 is opened to permit sludge again to pass therethrough for subsequent operation.

The rods 24–29 are affixed to the closure cap 23 by any known means. Preferably, they are welded thereto.

The use of a rod-type trap does an excellent job in removing debris from the slurry. Such a rod trap is more preferable to that of a screen in that screens have the tendency to block completely and restrict flow to an almost complete halt. By the use of a rod-type trap, the flow is not completely blocked. Furthermore, the rod-type trap is easy to clean. Disadvantageously, by using conventional devices without the rod-type trap, a suction pump would have to be taken apart, which is a time consuming endeavor.

What is claimed is:

1. A trap, for substantially removing debris from a slurry, comprising,
   A. A T shaped hollow pipe fitting having
      1. a serial section with an inlet end and an outlet end; and
      2. a shunt section having
         a. a first end engaging said serial section intermediate said inlet end and said outlet end; and
         b. a second end adapted to receive a closure cap;
   B. a closure cap adapted to engage said second end; and
   C. a plurality of extending rods coupled to said closure cap having a length sufficient to extend completely through said shunt section and into said serial section so as to trap debris passing from said inlet end toward said outlet end, wherein said rods are coupled to said cap in a staggered relationship.

2. The trap as recited in claim 1 wherein said rods are oriented parallel to each other.

3. A trap, for substantially removing debris from a slurry, comprising,
   A. A T shaped hollow pipe fitting having
      1. a serial section with an inlet end and an outlet end; and
      2. a shunt section having
         a. a first end engaging said serial section intermediate said inlet end and said outlet end; and
         b. a second end adapted to receive a closure cap;
   B. a closure cap adapted to engage said second end; and
   C. a plurality of extending rods coupled to said closure cap having a length sufficient to extend completely through said shunt section and into said serial section so as to trap debris passing from said inlet end toward said outlet end, wherein said pipe fitting is oriented in an inverted T relation whereby said shunt section is oriented in an upwardly vertical direction, and wherein said rods are coupled to said cap in a staggered relationship, said rods are oriented parallel to each other, one end of each of said rods is coupled to said closure cap and the other end of each of said rods is free.

4. The trap as recited in claim 3 wherein the free ends of said rods come into close proximity, but do not touch, the inner wall of said serial section opposing said shunt section.

5. The trap as recited in claim 4 wherein said closure cap is adapted to engage with said shunt section by threaded screw means.

6. The trap as recited in claim 5 further comprising
   D. a valve coupled to said inlet end; and
   E. a suction pump coupled to said outlet end.

7. A trap, for substantially removing debris from a slurry, comprising,
   A. a T shaped hollow pipe fitting having
      1. a serial section with an inlet end and an outlet end; and
      2. a shunt section having
         a. a first end engaging said serial section intermediate said inlet end and said outlet end; and
         b. a second end adapted to receive a closure cap;
   B. a closure cap adapted to engage said second end; and
   C. a plurality of extending rods coupled to said closure cap having a length sufficient to extend completely through said shunt section and into said serial section so as to trap debris passing from said inlet end toward said outlet end, wherein said rods are coupled to said cap in a staggered relationship.

8. The trap as recited in claim 7 wherein said rods are oriented parallel to each other.

9. A trap for substantially removing debris from a slurry, comprising,
   A. a T shaped hollow pipe fitting having
      1. a serial section with an inlet end and an outlet end; and
      2. a shunt section having
         a. a first end engaging said serial section intermediate said inlet end and said outlet end; and
         b. a second end adapted to receive a closure cap;
   B. a closure cap adapted to engage said second end; and
   C. a plurality of extending rods coupled to said closure cap having a length sufficient to extend completely through said shunt section and into said serial section so as to trap debris passing from said inlet end toward said outlet end, wherein said pipe fitting is oriented in an inverted T relation whereby said shunt section is oriented in an upwardly vertical direction, and wherein said rods are coupled to said cap in a staggered relationship, said rods are oriented parallel to each other, one end of each of said rods is coupled to said closure cap, and the other end of each of said rods is free.

10. The trap as recited in claim 9 wherein the free ends of said rods come into close proximity, but do not touch, the inner wall of said serial section opposing said shunt section.

11. The trap as recited in claim 10 wherein said closure cap is adapted to engage with said shunt section by threaded screw means.

12. The trap as recited in claim 11 further comprising
    D. a valve coupled to said inlet end; and
    E. a suction pump coupled to said outlet end.

13. A method for substantially removing debris from a slurry being fed to a suction pump, comprising the steps of
    A. transmitting slurry from a valve to said suction pump along a passageway;
    B. interposing a T shaped hollow pipe fitting having
       1. a serial section with an inlet end coupled to said valve, and an outlet end coupled to said pump; and
       2. a shunt section having
          a. a first end engaging said serial section intermediate said inlet end and said outlet end; and
          b. a second end adapted to receive a closure cap;
    C. engaging said second end with a closure cap having coupled thereto a plurality of rods which have a length sufficient to extend completely through said shunt section and into said serial section so as to trap debris which passes from said inlet end to said outlet end, said rods being independent from each other and free of connection to each other except for their coupling to said closure cap;

D. opening said valve so that slurry passes through said valve to said pump, whereby debris is substantially trapped by said rods; and
E. on occasion,
1. closing said valve;
2. disengaging said closure cap from said second end; and
3. wiping the rods in a motion from their closure cap ends to their free ends to remove debris entrapped thereon; and,
F. then,
1. reengaging said closure cap with said second end; and
2. opening said valve.

* * * * *